No. 786,754. PATENTED APR. 4, 1905.
A. GRAHAM.
TELEPHONIC APPARATUS.
APPLICATION FILED JAN. 11, 1904.

Witnesses. Inventor

No. 786,754. PATENTED APR. 4, 1905.
A. GRAHAM.
TELEPHONIC APPARATUS.
APPLICATION FILED JAN. 11, 1904.

Witnesses.

Inventor,
Alfred Graham
by his Attorney

No. 786,754. PATENTED APR. 4, 1905.
A. GRAHAM.
TELEPHONIC APPARATUS.
APPLICATION FILED JAN. 11, 1904.

Witnesses.
W. Hy Simms
F. Brougham

Inventor:
Alfred Graham
by his Attorney
W. Hy a Wise

No. 786,754. PATENTED APR. 4, 1905.
A. GRAHAM.
TELEPHONIC APPARATUS.
APPLICATION FILED JAN. 11, 1904.

No. 786,754. PATENTED APR. 4, 1905.
A. GRAHAM.
TELEPHONIC APPARATUS.
APPLICATION FILED JAN. 11, 1904.

Witnesses
Inventor,
Alfred Graham
by his Attorney

No. 786,754. PATENTED APR. 4, 1905.
A. GRAHAM.
TELEPHONIC APPARATUS.
APPLICATION FILED JAN. 11, 1904.

Witnesses.

Inventor,
Alfred Graham
by his Attorney

No. 786,754. PATENTED APR. 4, 1905.
A. GRAHAM.
TELEPHONIC APPARATUS.
APPLICATION FILED JAN. 11, 1904.

Witnesses
Inventor,
Alfred Graham
by his Attorney

No.786,754. Patented April 4, 1905.

UNITED STATES PATENT OFFICE.

ALFRED GRAHAM, OF DENMARK HILL, ENGLAND.

TELEPHONIC APPARATUS.

SPECIFICATION forming part of Letters Patent No. 786,754, dated April 4, 1905.

Application filed January 11, 1904. Serial No. 188,597.

*To all whom it may concern:*

Be it known that I, ALFRED GRAHAM, a subject of the King of Great Britain and Ireland, residing at Denmark Hill, in the county of London, England, have invented Improvements in Telephonic Apparatus, of which the following is a specification.

This invention has reference to a construction of water-tight telephonic apparatus that is specially adapted for use in exposed positions, such as on the bridge of a ship, which can be used without alteration by persons of different heights, which can be turned about a vertical axis, so that the user can face in any desired direction, and by means of which the user can while sending and receiving telephonic messages observe objects at a distance in front of or at either side of the apparatus. For this purpose the telephonic transmitter and receiver are arranged within a casing mounted to turn around a horizontal sound-tube fixed to a holder that is mounted to turn about a vertical pillar or support, the said tube being in communication at an intermediate portion of its length with the telephonic receiver and at its ends with two normally depending hearing-tubes, one of which (hereinafter called for distinction the "main" hearing-tube) is fixed to the casing and serves as a handle for rotating the same, and the other of which is jointed to the holder, and both of which are provided at their free ends with earpieces, the transmitter being arranged to come opposite a speaking-aperture through the casing. The arrangement is such that the holder with casing and attached parts can be rotated upon the pillar about a vertical axis and that by raising the main hearing-tube into position for use the casing will be simultaneously rotated about a horizontal axis and the speaking-aperture in the casing brought into a convenient position for speaking onto the diaphragm of the transmitter, the user of the instrument being at the same time free to look over the periphery or past the ends of the casing at objects in front or to either side thereof. The sound-tube is adapted to carry the stationary contacts and the rotary casing the movable contacts of a switch device that is connected to the transmitter and receiver, to a bell, to line-wires, and an electric battery in such a manner that when the hearing-tubes are released and allowed to hang downward the bell will be in circuit and the transmitter and receiver out of circuit, and when the main hearing-tube is raised and the casing turned into position for use the bell will be cut out of circuit and the transmitter and receiver brought into circuit. The various conductors connected to the stationary contacts and terminals are led through the rotary holder and, it may be, the vertical pillar or support.

The invention consists in various novel features of construction and in combinations and arrangements of parts, all as hereinafter more particularly described, and pointed out in the claims.

Referring to Figs. 1 to 11, inclusive, *a* is a telephonic transmitter, and $b$ a telephonic receiver located within a cylindrical casing $c$, that is mounted to turn around a horizontal sound-tube $d$, carried by a holder $e$, mounted to turn around a hollow vertical pillar $f$, the central portion of the tube being in communication with the receiver $b$ and its ends being in communication with external hearing-tubes $g$ and $h$. In the example shown the tube $d$ is flanged at one end at $k$ and fixed to a disk $m$, secured to the upper end of the side portion $e'$ of the holder $e$, which is made hollow and of stirrup shape, the other end of the tube extending through the upper end of the opposite side portion $e^2$ of the holder. Casing $c$ is mounted at one side to rotate around disk $m$, a water-tight joint being formed between the two by a packing-ring $n$, preferably of circular section and of material such as cotton wick impregnated with tallow. The opposite side of casing $c$ is formed with a boss $o$, mounted to rotate in the side portion $e^2$ of the holder $e$ and is bored to form a bearing for the corresponding end of the tube $d$, which extends through it. The casing $c$ has an opening $p$, normally closed by a plate $q$ and through which access can be obtained to its interior. The lower portion of the holder $e$ is provided with a sleeve $r$, adapted to fit over and rotate upon the top of pillar $f$, antifriction-balls $s$ being placed between the under side of the holder and the top of the pillar to facilitate turning movement, and also a ring $t$, of material such as cotton wick, to prevent the holder and attached parts turning too freely. The sleeve $r$ is provided at different heights with set-screws $u$, taking into recesses $v$, extending nearly around the pillar for the purpose of preventing vertical movement of the holder $e$ and attached parts, while allowing of their being turned through nearly a complete circle. The upper end of the main hearing-tube $g$ is fixed to the boss $o$ of casing $c$ for the purpose of turning the same about a horizontal axis. It is also fixed, as by screwing, to a tube $w$, that extends along and closely fits a portion of the sound-tube $d$, so as to prevent escape of sound-waves between the boss and hearing-tube. In the opposite side $e'$ of holder $e$ is mounted a ball 1, that has a central passage 2 therethrough in communication with the tube $d$, and a shank 3, to which is fixed the upper end of hearing-tube $h$. Both hearing-tubes are of rigid material, such as metal, and have their lower ends bent toward each other and provided with earpieces $i$, fitted with hollow rings or pads 4, of india-rubber. A spring 5, Fig. 2, may be used to insure the return of the casing $c$ when released to its normal position. The transmitter $a$ is preferably a waterproof one of the kind described in the specification of a former patent granted to me, No. 655,620. It is mounted in a holder 6, having a mouthpiece 7 and provided with a perforated protecting-plate 8 opposite the transmitter-diaphragm, and is secured to the inner periphery of casing $c$ opposite a hole 9 therein, which when the casing is in its normal position with the hearing-tubes hanging downward, as in Figs. 1 and 2, will be at the bottom of the casing. The receiver $b$ is preferably of known kind, comprising a strong permanent magnet $b'$, Figs. 10 and 11, fixed to a base-piece $b^2$ and having inwardly-turned ends $b^3$, with polar extensions $b^4$, that terminate near to the diaphragm $b^5$ and carry the receiver-coils $b^6$. The base-piece $b^2$ has a tubular extension 10, that is attached to a lateral tubular extension $d'$ of the sound-tube $d$, Fig. 2. To prevent the magnet $b'$ affecting external apparatus—for example, a ship's compass—it may, as shown, be provided with a cover $b^7$, which, as well as the base-piece $b^2$, is made of iron, so as to form an ironclad receiver. The switch device comprises a set of fixed spring-contacts 11, 12, 13, 14, and 15 and terminals 16 and 17, fixed to a bar 19, of insulating material, carried by a support 20, that is secured by a boss 21 to a second tubular extension $d^2$ of the sound-tube $d$. 23 and 24 are movable switch-contacts fixed upon a disk 25, of insulating material, secured to the inner surface of the right-hand end of the rotary casing $c$. Contact 23 consists of a segment of a flat metal ring so arranged, as shown, that when partly rotated by the casing $c$ from its normal position (shown in Fig. 5) to that shown in Fig. 6 it will be brought into electric connection with contacts 11 and 12. Contact 24 consists of a flat metal ring formed with a segmental opening 26, bridged by an outer segmental-shaped piece 26$^a$, of metal. Contacts 11 and 15 are connected, as shown diagrammatically in Fig. 5, by conductors 27 and 28 to two insulated line-conductors 27$^a$ and 28$^a$, contact 12 and terminal 17 are connected to the terminals 29 and 29* of the transmitter $a$, contact 13 is connected by a conductor 30$^a$ to one terminal of a bell 30, the other terminal of which is connected by a conductor 30$^b$ to earth or a return-conductor E, and terminal 14 is connected to one end of the telephonic receiver-coils $b^6$, the other end of which is connected to terminal 16, which is also connected to earth or the return-conductor E. The positive pole of an electric battery 32 is connected by a conductor 32$^a$ to terminal 17 and the negative pole is connected to earth or the return-conductor E. The bell 30 may be inclosed in a casing 31, fixed to the sleeve $r$ of the rotary holder $e$, Figs. 3 and 9. 33 is a bell-push for ringing up the bell of a telephonic instrument at a distant station. It is carried by the upwardly-extending portion $e^2$ of the holder $e$, Fig. 3, and is arranged to force a spring-blade contact 34 against a fixed contact 35, the two contacts being respectively connected to conductors 36 and 37, extending through the hollow holder, and of which 36 is connected to the positive pole of the battery 32, and 37 is connected to the line-wire 27ᵃ. Normally contacts 11, 12, and 14 bear upon the rotary insulating-disk 25, Fig. 5, while contact 13 bears upon the portion 26ᵃ of ring 24, upon which the contact 15 constantly bears. In this position of the parts the circuit of the bell 30 is closed at the instrument, but is open in another telephonic instrument at a distant station, so that the apparatus stands ready to be called up from the distant station, and the circuits of the transmitter $a$ and receiver $b$ are open. Also the circuit between the battery 32 and line-wire 27ᵃ is normally open between the contacts 34 and 35. Upon turning the casing $c$ with contacts 23 and 24, say, into the position shown in Fig. 6 contacts 11 and 12 will bear upon contact 23, so as to complete the circuit of the transmitter $a$, contact 13 will bear upon an annular portion 25ᵃ of the insulating-disk and break the bell-circuit, and contact 14 will bear upon the contact 24, upon which contact 15 is already bearing, and complete the receiver-circuit, so that the apparatus can then be used for sending and receiving telephonic messages in a known way. By pressing the bell-push 33 the circuit between the battery 32 and line-wire 27ᵃ can be closed for the purpose of ringing up a similar instrument at a distant station to which the line-wires 27ᵃ and 28ᵃ are connected. The conductors connected to the several fixed contacts 11, 13, and 15 and terminals 16 and 17 are led through holes 38 in one side of the holder $e$, Fig. 4, and the disk $m$ and flanged end $k$ of the sound-tube $d$, the conductors being led into the adjacent hollow portion $e'$ of the holder, where they are connected to a set of terminals 39, fixed upon an insulating-base 40, secured to the holder, the latter terminals being also connected to corresponding conductors extending downward through the said holder and the pillar $f$. The portion $e'$ of the holder has a removable cover-plate.

The operation of the apparatus is as follows: Normally the various parts of the apparatus are in the position shown in Figs. 1 to 5, inclusive, in which the transmitter and receiver are out of circuit and the bell-circuit closed through the contacts 13, 26ᵃ, 24, and 15, so that the bell can be rung by the closing of its circuit at a distant station through the line-wire 28ᵃ. Upon raising the tube $g$ into a convenient position to be applied to the ear of the operator the casing $o$ will be moved into a position to bring the opening 9 therein into a convenient position for speaking into the transmitter $a$, and the circuits of the transmitter $a$ and receiver $b$ will be simultaneously closed and that of the bell opened, so as to enable the operator to carry on a telephonic conversation with another person at the distant station, the telephonically-received sounds passing from the receiver into the central portion of the sound-tube $d$ and thence to the hearing-tubes $g$ and $h$. During this time the operator can look over the top or either side of the instrument in order to observe a distant object and can readily turn the casing $c$ and holder $e$ around the vertical pillar $f$ or hold it while the pillar moves within the sleeve $r$, so as to keep the object constantly in view. As will be obvious, the apparatus is for this reason specially suitable for use on board a ship.

Figure 12:
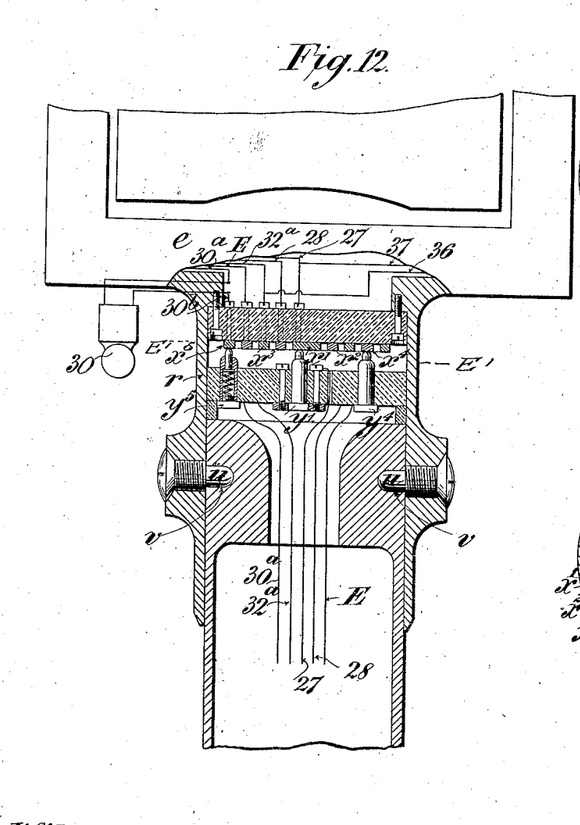
Fig. 12 is a vertical section through portions of the holder and pillar, showing a modified construction.
Figure 13:
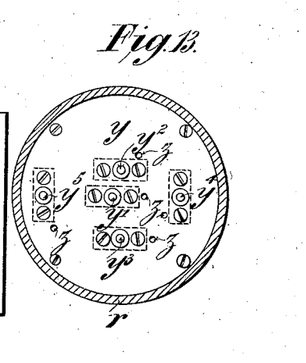
Figs. 13 and 14 are sectional views on the line E' E' of Fig. 12, Fig. 13 being a plan or top view and Fig. 14 an inverted view.
Figure 14:
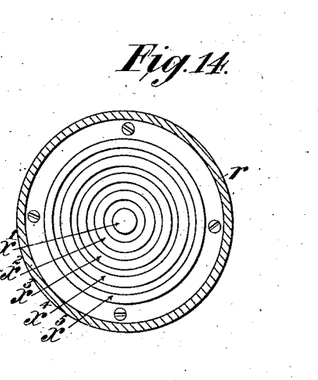

In the modified construction shown in Figs. 12, 13, and 14 the holder is mounted so that it can make one or more complete revolutions upon the pillar $f$. For this purpose the sleeve $r$ carries a plate $x$ of insulating material, to which are secured concentrically-arranged circular contacts $x'$ $x^2$ $x^3$ $x^4$ $x^5$, against which respectively bear spring-contacts $y'$ $y^2$ $y^3$ $y^4$ $y^5$, carried by a plate $y$, of insulating material, secured to the pillar $f$. The set-screws $u$ in this case take into a single recess $v$, extending completely around the pillar. To the two sets of contacts are connected the two portions of the conductors 27, 28, 30ᵇ, 32ᵃ, and E, which pass to the switch device within the casing $c$ and to the battery and bell, the lower portions of the conductors passing from the fixed contacts through holes $z$ in the plate $y$.

Figure 1:
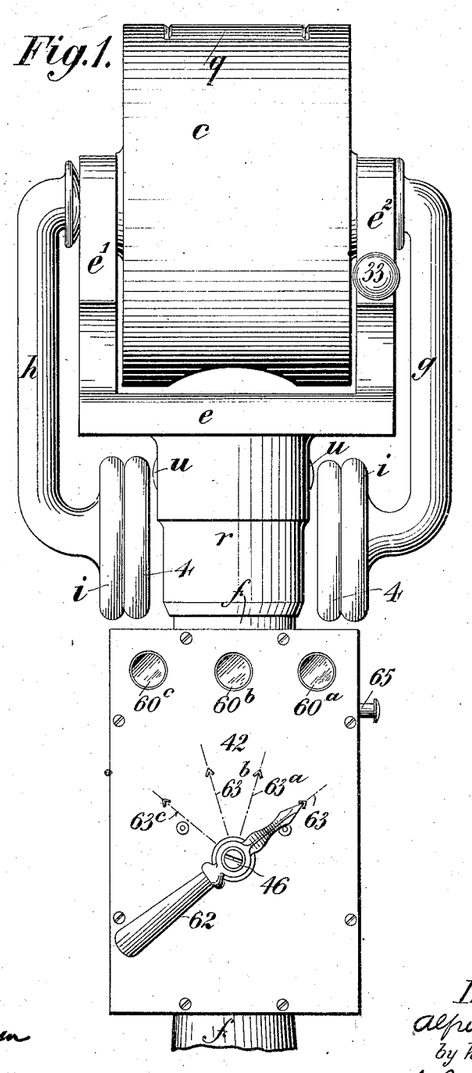
Figure 1 shows in front elevation, and Fig. 2 in longitudinal vertical section, one construction of telephonic apparatus according to this invention.
Figure 2:
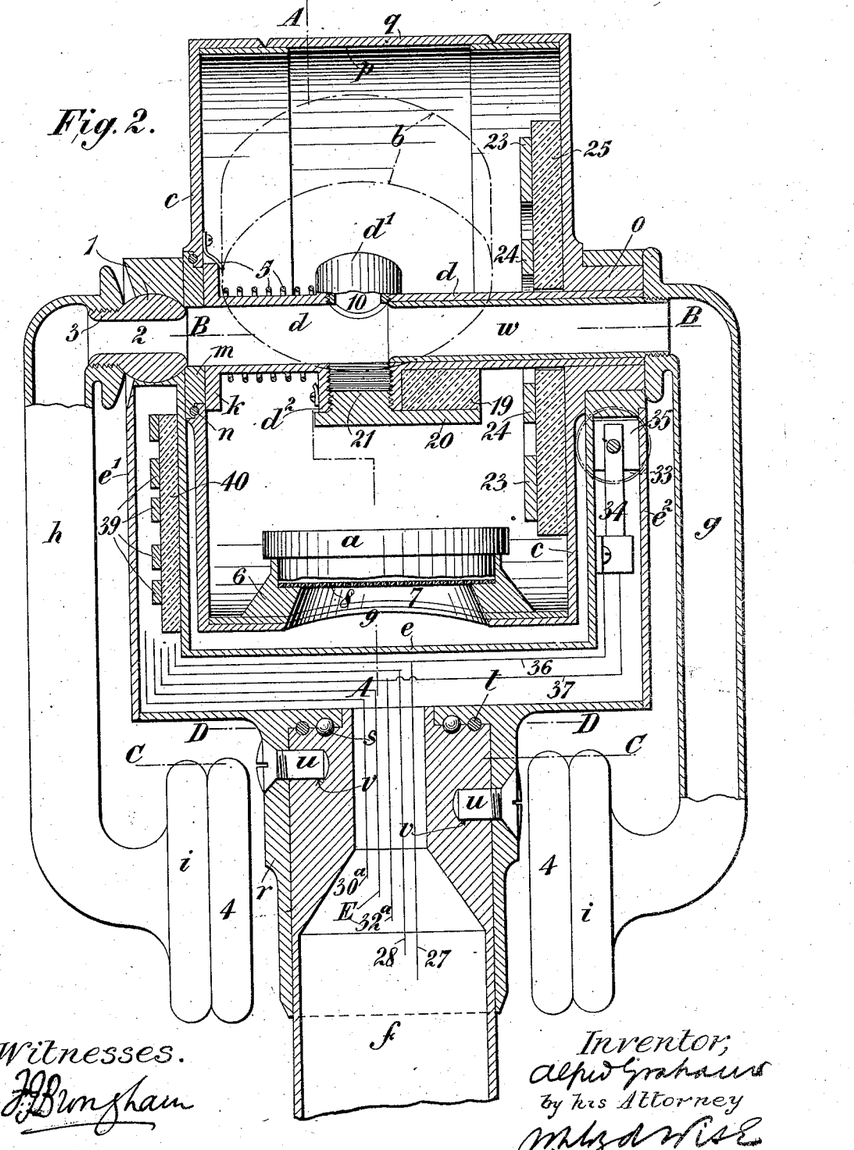
Figure 3:
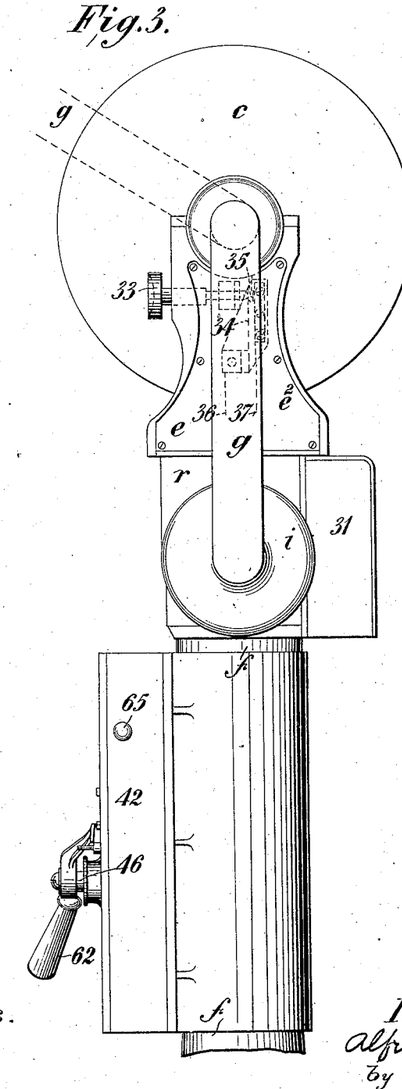
Fig. 3 is a view of the right-hand end of the apparatus, and Fig. 4 a view of a portion of the left-hand end thereof.
Figure 4:
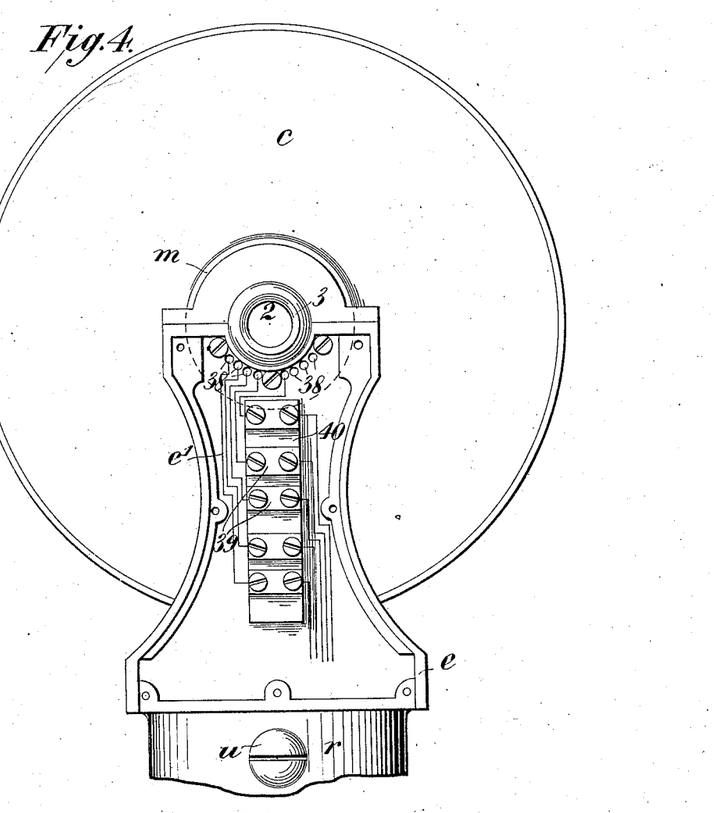
Figure 5:
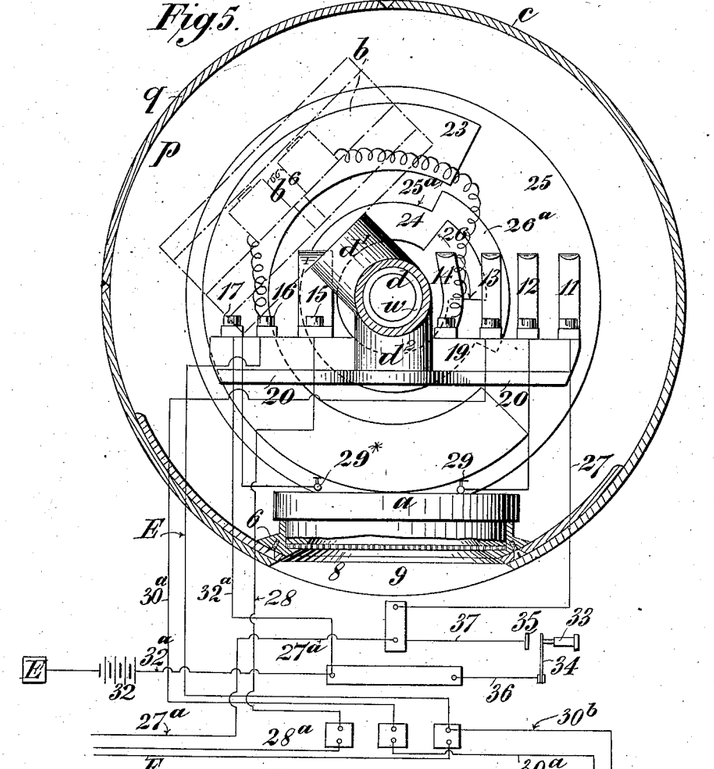
Fig. 5 is a vertical section on the line A A of Fig. 2, the position of the telephonic receiver being indicated in dotted lines.
Figure 6:
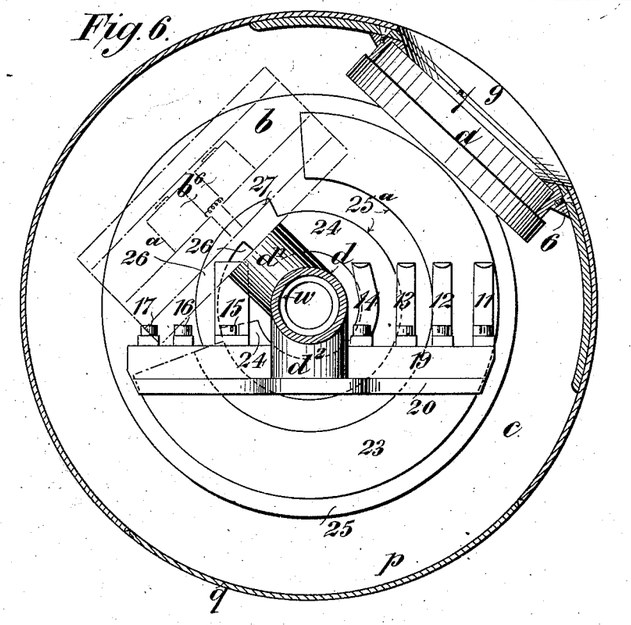
Fig. 6 is a similar view to Fig. 5, but shows the rotary casing and attached parts in a different position.
Figure 7:
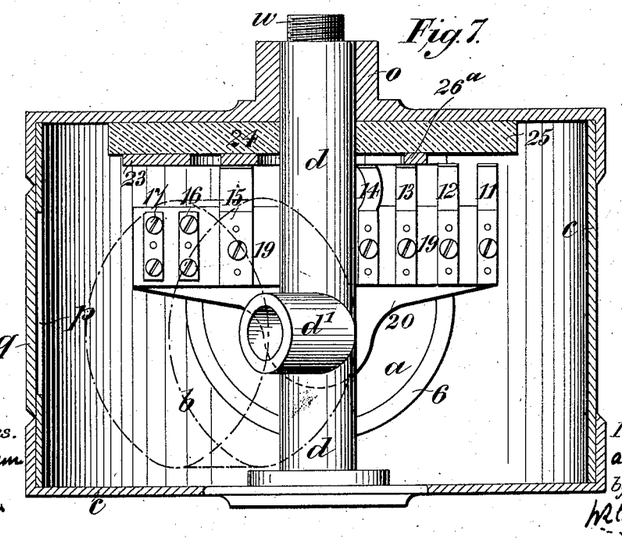
Fig. 7 is a horizontal section on the line B B of Fig. 2, but with the telephonic receiver removed.
Figure 8:
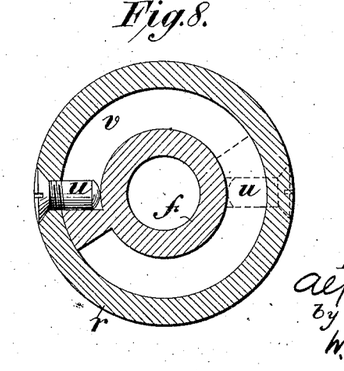
Figs. 8 and 9 are horizontal sections on the lines C C and D D, respectively, of Fig. 2.
Figure 9:
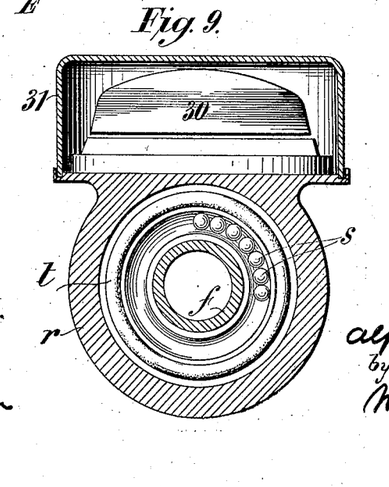
Figure 10:
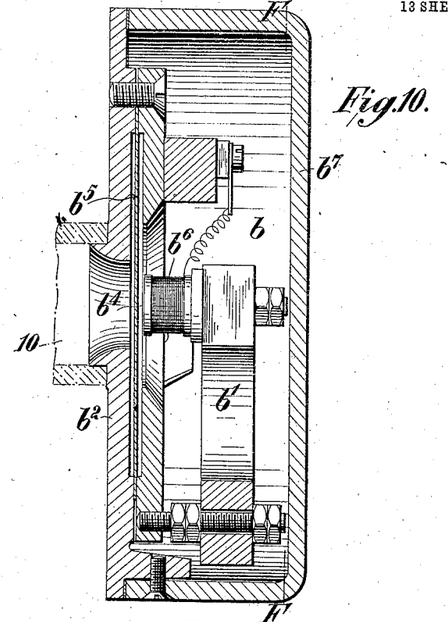
Fig. 10 is a section on the line E E of Fig. 11.
Figure 11:
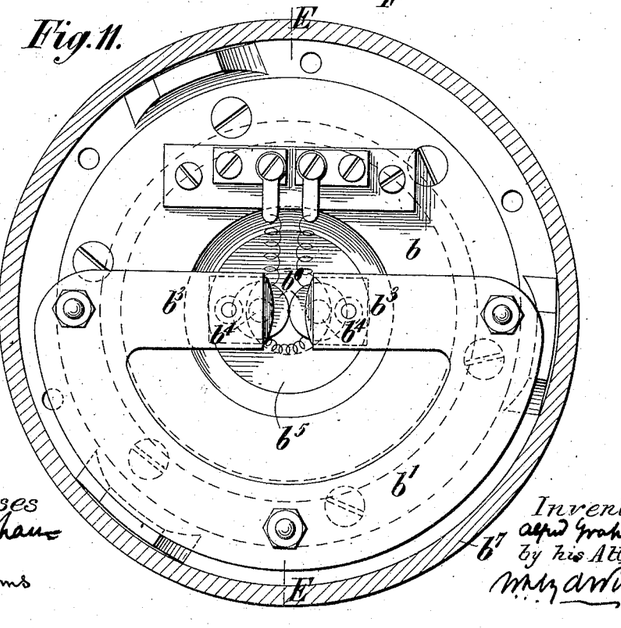
Fig. 11 is a section on the line F F of Fig. 10, showing an ironclad receiver.

In some cases there may be mounted upon a stationary part of the apparatus—for example, upon the pillar $f$, as shown in Figs. 1 and 3—a supplementary switch device 42, whereby the conductors 27 and 28 of the telephonic apparatus can be connected up at will with line-wires extending to two or more telephonic apparatus at distant stations. In the example shown in Figs. 1 and 3 and in Fig. 15 the supplementary switch apparatus is adapted to connect the conductors 27 and 28 to any one of three sets of line conductors 27ᵃ 28ᵃ, 27ᵇ 28ᵇ, and 27ᶜ 28ᶜ, extending to telephonic apparatus—say in the poop, engine-room, and forecastle, respectively, of a ship. For this purpose the conductor 27 is connected to one of three electrically-connected fixed contacts 67ᵃ, 67ᵇ, and 67ᶜ, and conductor 28 is connected to one of three electrically-connected fixed contacts 69ᵃ 69ᵇ 69ᶜ. The three line-wires 27ᵃ, 27ᵇ, and 27ᶜ are connected, respectively, to three movable spring-blade contacts 70ᵃ, 70ᵇ, and 70ᶜ, and the three line-wires 28ᵃ, 28ᵇ, and 28ᶜ are respectively connected to three movable spring-blade contacts 71ᵃ, 71ᵇ, and 71ᶜ. The contacts 71ᵃ, 71ᵇ, and 71ᶜ respectively bear against the contacts 70ᵃ 70ᵇ 70ᶜ through insulating distance-pieces 72. The free ends of contacts 70ᵃ 70ᵇ 70ᶜ terminate, respectively, in front of but are normally held away from contacts 67ᵃ 67ᵇ 67ᶜ. The free ends of contacts 71ᵃ 71ᵇ 71ᶜ terminate in front of and normally bear, respectively, against fixed contacts 73ᵃ 73ᵇ 73ᶜ. These latter contacts are respectively connected, through conductors 74ᵃ 74ᵇ 74ᶜ, to the windings of three ordinary electric indicators 58ᵃ 58ᵇ 58ᶜ, provided, respectively, with shutters 59ᵃ 59ᵇ 59ᶜ, that are normally opposite corresponding apertures 60ª, 60ᵇ, and 60ᶜ in the front cover of the switch-box 42 and opposite a strip of glass therein that forms the front of a longitudinal chamber 42ª, into which the light of a lamp 75 can pass at night-time. Upon the strip of glass and opposite the apertures 60ª, 60ᵇ, and 60ᶜ are marked the words of the station to which the indicators correspond—for example, "Poop," "Engine-room," and "Forecastle." The other ends of the windings of the indicator are connected to a conductor 61, that is connected to one terminal of the bell 30, the other terminal of which is connected to the return-conductor E, as before.

Figure 15:
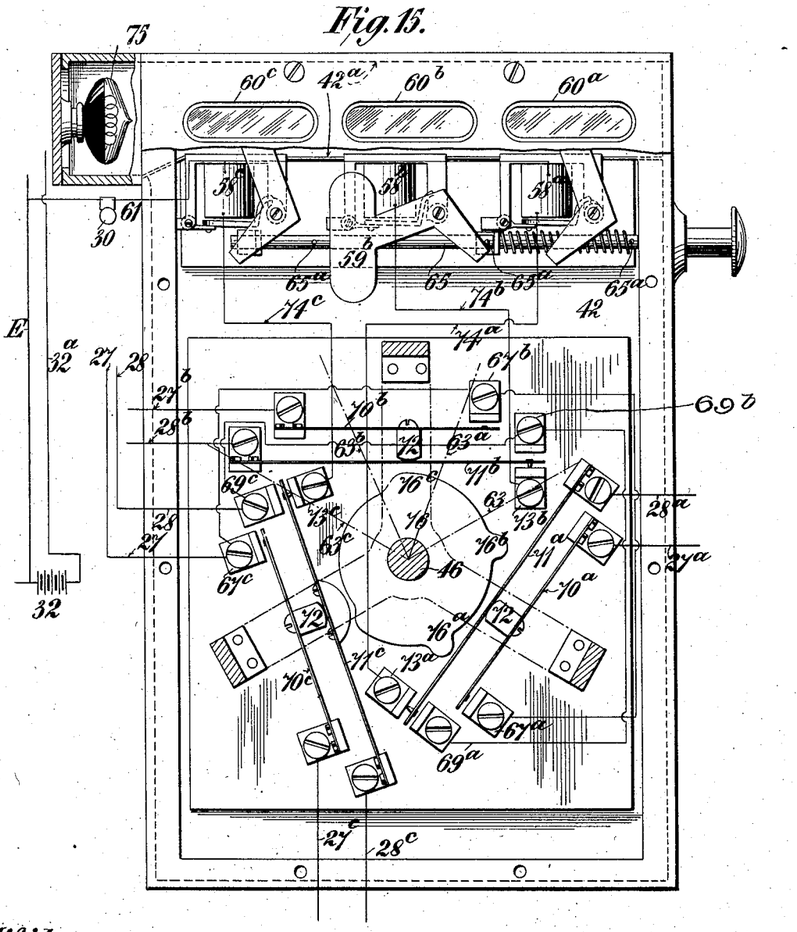
Fig. 15 is a front view with a portion of the cover removed, showing a supplementary switch device.
Figure 16:
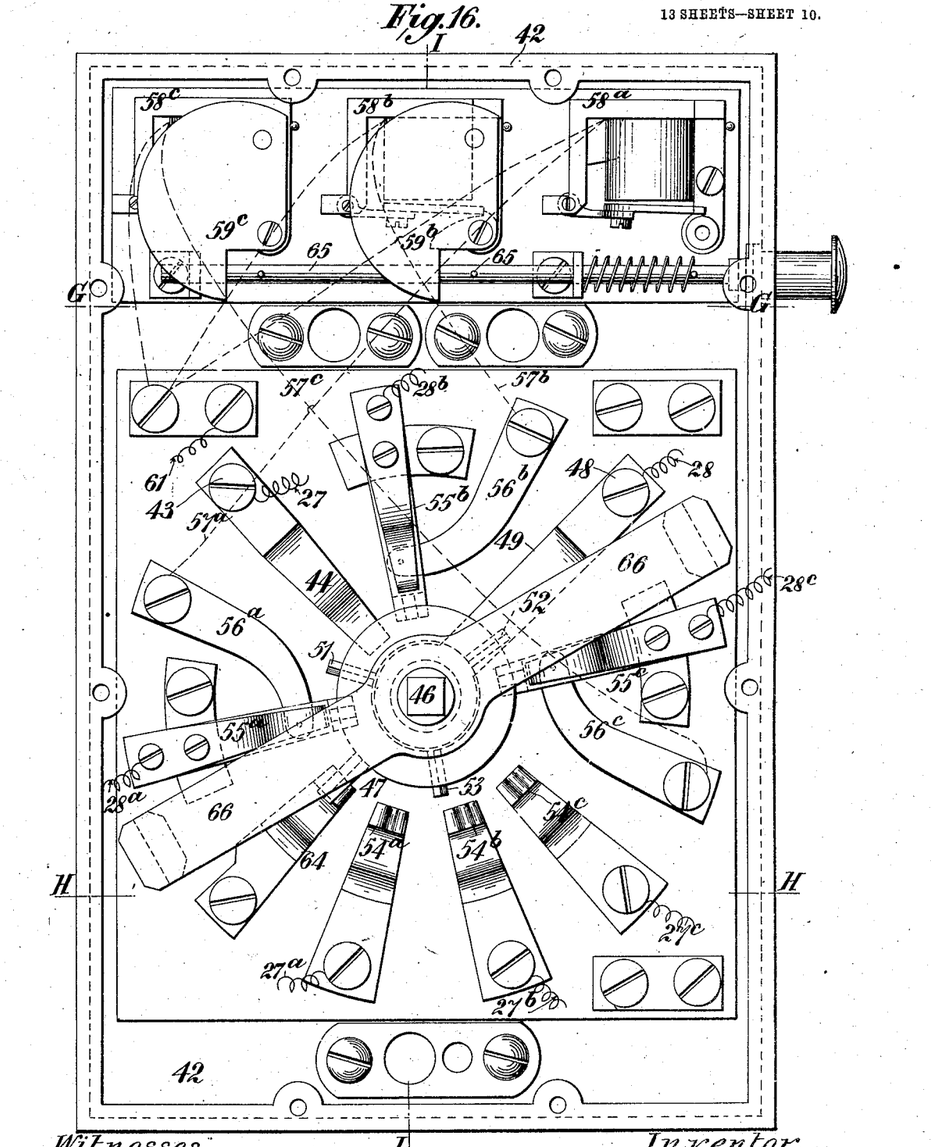
Fig. 16 is a similar view to Fig. 15, showing a modified construction of supplementary switch device.
Figure 17:
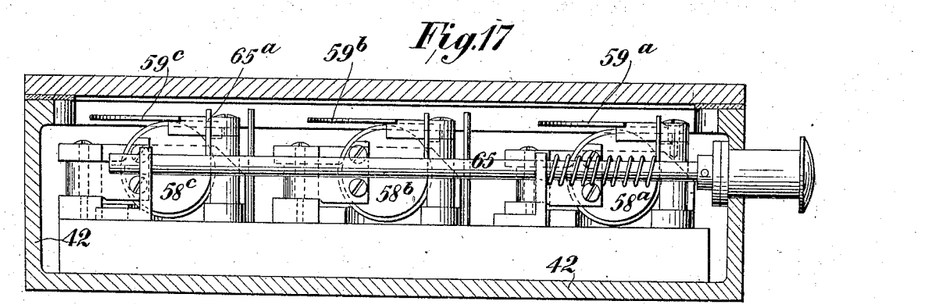
Figs. 17, 18, and 19 are sections on the lines G G, H H, and I I, respectively, of Fig. 16.
Figure 18:
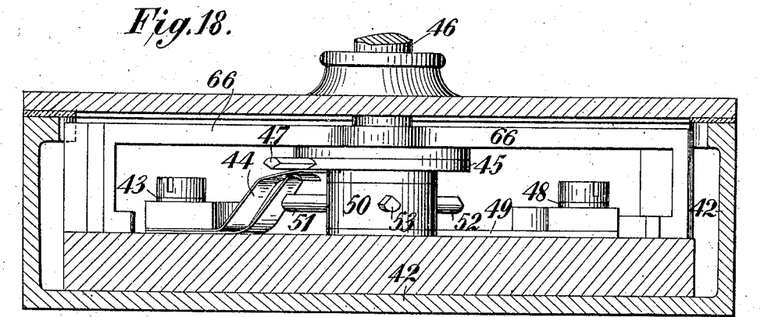
Figure 19:
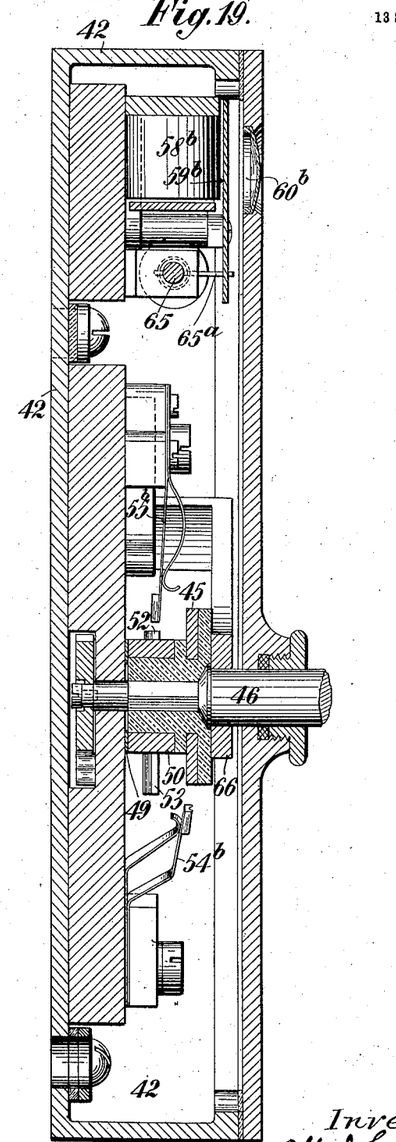
Figure 20:
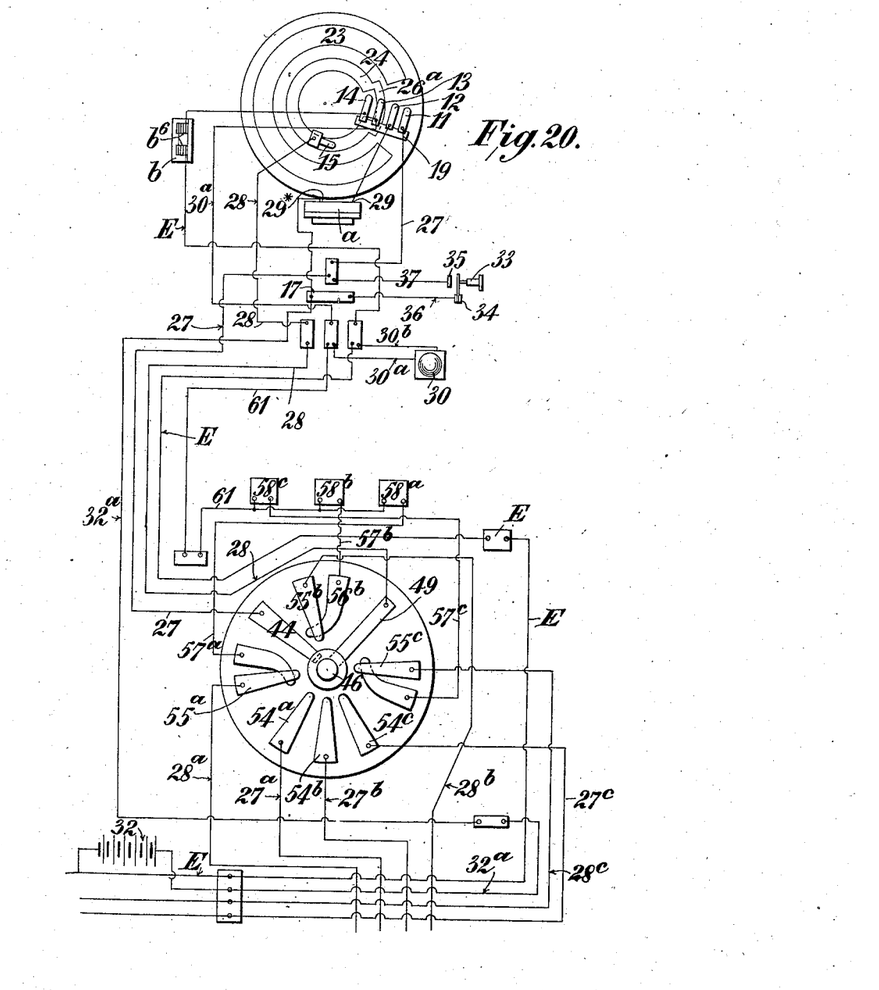
Fig. 20 is a diagram.

76 is a cam fixed to a spindle 46 and provided with operative parts 76ª 76ᵇ 76ᶜ, that can be caused to bear, respectively, against and operate the pairs of contact-blades 71ª 70ª, 71ᵇ 70ᵇ, and 71ᶜ 70ᶜ by rotating the spindle 46 by means of a handle 62, Figs. 1 and 3, from the normal position 63 into the successive positions 63ª 63ᵇ 63ᶜ.

65 is a rod with pins 65ª for returning each indicator-shutter to its normal position after being released. One of the shutters—viz., 59ᵇ—is shown released.

The operation of the supplementary switch is as follows: When the parts are in the positions shown in Fig. 15, a current can be sent from any one of the distant stations, through the corresponding line-wire 28ª, 28ᵇ, or 28ᶜ and the corresponding indicator 58ª, 58ᵇ, or 58ᶜ, to the bell 30 and thence to the return-conductor E, the corresponding indicator-shutter falling to indicate which station is ringing up. By then rotating the spindle 46 so as to bring the handle 62 into the position—say 63ª—corresponding to the indicator that has been operated—say, for example, the poop-indicator 58ª—the cam projection 76ª will come into action and move the contact 71ª from contact 73ª and cause it to bear against contact 69ª and at the same time cause contact 70ª to bear against contact 67ª, thereby opening the corresponding indicator-circuit, so as to stop the bell and connecting the line-wires 28ª and 27ª to the conductors 28 and 27, respectively, of the telephonic apparatus. The latter apparatus can after rotating the cylinder c, Figs. 1, 2, and 3, be then used, as before, for sending and receiving telephonic messages. To ring up either station, the handle 62 is moved into the operative position 63ª, 63ᵇ, or 63ᶜ corresponding to the station required and the push 33, Fig. 3, operated to send a current from the battery, through the conductor 27, to the corresponding line-wire of the required station, after which telephonic messages can be sent and received as before.

In the modified construction of supplementary apparatus shown in Figs. 16 to 20, inclusive, the conductor 27 is connected, through a terminal 43, to a spring-contact 44, that bears against the under side of a contact-ring 45, that is fixed to but insulated from the spindle 46 and is provided with a contact-pin 47. The conductor 28 is connected, through a terminal 48 and a metal strip 49, to a metal sleeve 50, that is also fixed to but insulated from the spindle 46 and is provided with three contact-pins 51, 52, and 53. The line conductors 27ª, 27ᵇ, and 27ᶜ are respectively connected to three stationary spring-contacts 54ª, 54ᵇ, and 54ᶜ. The line conductors 28ª, 28ᵇ, and 28ᶜ are respectively connected to three spring-contacts 55ª, 55ᵇ, and 55ᶜ, which normally bear upon fixed contacts 56ª, 56ᵇ, and 56ᶜ. The latter contacts are respectively connected by conductors 57ª, 57ᵇ, and 57ᶜ to the windings of three ordinary electric indicators 58ª, 58ᵇ, and 58ᶜ, provided, respectively, with shutters 59ª, 59ᵇ, and 59ᶜ, arranged opposite corresponding apertures 60ª, 60ᵇ, and 60ᶜ in the front cover of the switch-box 42, Fig. 1. The other ends of the three windings of the indicators are connected to the conductor 61, that is connected to one terminal of the bell 30, the other terminal of which is connected, as before, to the return-conductor E. The contact-pin 47 is arranged to be brought into contact successively with the fixed contacts 54ª, 54ᵇ, and 54ᶜ by rotating the spindle 46 by means of the handle 62, Figs. 1 and 3, from the normal position 63 into the successive positions 63ª, 63ᵇ, and 63ᶜ. Normally the contact-pin 47 bears upon a dummy contact 64, Fig. 16. The contact-pins 51, 52, and 53 are normally out of contact, but are arranged to respectively lift in succession the spring-contacts 55ª, 55ᵇ, and 55ᶜ from contacts 56ª, 56ᵇ, and 56ᶜ when brought into the three respective positions mentioned. 66 is a bridge-piece for holding the contact-rings 45 and 50, with insulating material, in place within the switch-box 42. The operation of this switch is similar to that of the switch shown in Fig. 15, except that when the spindle 46 is rotated to bring the handle 62 into the position corresponding to the indicator that has been operated—say, for example, the poop-indicator 58ª—the contact-pin 47 will be caused to bear upon the spring-contact—say 54ª—and connect the conductor 27 to the corresponding line conductor 27ª through the contact-ring 45, and the corresponding contact-pin 51 will bear against and lift the corresponding spring-contact 55ª from the fixed contact 56ª, so as to place the conductor 28 in connection with the corresponding line conductor—say 28ª—through the sleeve 50 and open the corresponding indicator-circuit and stop the bell 30, which, however, is left free to be rung from either of the other stations.

As will be obvious, the details of construction can be variously modified without departing from the essential features of the invention.

What I claim is—

1. Telephonic apparatus comprising a casing, a sound-tube about which said casing is mounted to turn, a holder carrying said sound-tube and mounted to turn about an axis at right angles to that of the sound-tube, and a transmitter and receiver located within said casing.

2. Telephonic apparatus comprising a casing, a sound-tube about which said casing is mounted to turn, a holder carrying said sound-tube and mounted to turn about an axis at right angles to that of the sound-tube, a transmitter and a receiver located within said casing, and a switch device also located within said casing and adapted to control the circuits of said transmitter and receiver.

3. Telephonic apparatus comprising a casing, a horizontal sound-tube about which said casing is mounted to turn, a holder carrying said sound-tube and a pillar upon which said holder is mounted, and upon which it can turn about a vertical axis, said casing containing a transmitter and receiver and having a speaking-aperture in its periphery.

4. Telephonic apparatus comprising a casing, a horizontal sound-tube about which said casing is mounted to turn, a holder carrying said sound-tube and a pillar upon which said holder is mounted, and upon which it can turn about a vertical axis, said casing having a speaking-aperture in its periphery and containing a transmitter, a receiver and a switch device, said switch device controlling the circuits of said transmitter and receiver, and the electrical connections for said switch, receiver and transmitter extending through said pillar and casing.

5. Telephonic apparatus comprising a casing having a speaking-aperture in its periphery, a sound-tube about which said casing is mounted to turn, a transmitter arranged within said casing to come opposite said aperture, a receiver located within said casing and having its diaphragm opposite a passage communicating with said sound-tube, and means for controlling the circuits of said transmitter and receiver by movement of said casing.

6. Telephonic apparatus comprising a casing, a sound-tube about which said casing is mounted to turn, a holder carrying said sound-tube and mounted to turn about an axis at right angles to that of the sound-tube, a transmitter and a receiver located within said casing, and means for controlling the circuits of said transmitter and receiver and adapted to be operated by movement of said casing.

7. Telephonic apparatus comprising a casing, a horizontal sound-tube about which said casing is mounted to turn, a holder carrying said sound-tube and a pillar upon which said holder is mounted, and upon which it can turn about a vertical axis, said casing inclosing a transmitter and receiver, and a switch device controlled by movement of said casing about a horizontal axis and adapted to control the circuits of said transmitter and receiver.

8. Telephonic apparatus comprising a casing, a sound-tube about which said casing is mounted to turn, a holder carrying said sound-tube and mounted to turn about an axis at right angles to that of the sound-tube, a transmitter and a receiver arranged within said casing, the transmitter being arranged to come opposite an opening in said casing and said receiver having its diaphragm opposite a space in communication with said sound-tube, hearing-tubes connected to said sound-tube, and a switch device located within said casing and adapted to control the circuits of said transmitter and receiver, some of the switch connections being carried by said casing and some by said sound-tube.

9. Telephonic apparatus comprising a casing, a horizontal sound-tube about which said casing is mounted to turn, a holder carrying said sound-tube, a support upon which said holder is mounted to turn about a vertical axis, a transmitter located within and having its diaphragm opposite an opening in said casing, a receiver located within said casing and having its diaphragm opposite a passage communicating with the interior of said sound-tube, hearing-tubes in communication with said sound-tube and one of which is fixed to said casing, a bell external to said casing, and a switch device located within said casing and adapted to control the circuits of said transmitter, receiver and bell, some of the switch connections being carried by said casing and others by said sound-tube so as to be controlled by movement of said casing.

10. Telephonic apparatus comprising a cylindrical casing, a horizontal sound-tube about which said casing is mounted to turn, a hollow holder carrying said sound-tube, a hollow pillar upon which said holder is mounted to turn about a vertical axis, a transmitter arranged within said casing so as to be opposite an opening therein, a receiver having its diaphragm opposite a passage communicating with said sound-tube, movable hearing-tubes in connection with said sound-tubes and one of which is fixed to said casing, a bell external to said casing, and a switch device located within said casing and adapted to control the circuits of said transmitter, receiver and bell by movement of said casing, said holder being formed with holes through which the electrical switch connections can be led to and from the casing and switch and through the vertical support and holder.

11. Telephonic apparatus comprising a hollow vertical support, a hollow U-shaped holder mounted to turn thereon about a vertical axis, a horizontal sound-tube carried by said holder, a casing mounted to turn about said sound-tube and formed with a speaking-aperture in its periphery, a transmitter arranged within said casing so that its diaphragm will come opposite said speaking-aperture, a receiver arranged within said casing so that its diaphragm is opposite a passage communicating with said sound-tube, a bell external to said casing, hearing-tubes in communication with the ends of said sound-tube, and one of which is fixed to said casing, a switch device carried partly by said casing and partly by said sound-tube and adapted to control the circuits of said transmitter, receiver and bell, and a circuit-maker carried by said holder and whereby the circuit of a bell at a distant station can be closed.

12. Telephonic apparatus comprising a hollow stationary support, a hollow U-shaped holder mounted to turn thereon about a vertical cal axis, a sound-tube carried by said holder, a casing mounted to turn about said sound-tube and formed with a speaking-aperture in its periphery, a water-tight transmitter fixed to the inner side of said casing so that its diaphragm is opposite said speaking-aperture, a receiver located within said casing and carried by said sound-tube and having its diaphragm opposite a passage communicating with said tube, hearing-tubes in communication with the ends of said sound-tube and one of which is fixed to said casing, a bell external to said casing, a switch the stationary portions of which are carried by said sound-tube and the rotary portions of which are carried by said casing and which is adapted to control the circuits of said transmitter, receiver and bell as herein set forth, said casing and holder being formed with holes through which the conductors connected to said switch can be led from the casing to the holder and thence through the hollow stationary support, and a circuit-making device comprising a bell-push and fixed and movable contacts and whereby the circuit of a bell at a distant station can be closed.

13. Telephonic apparatus comprising a casing formed with a speaking-aperture in its periphery, means for supporting said casing so that it can turn about axes at right angles to one another, a waterproof transmitter located within said casing with its diaphragm opposite said speaking-aperture, a sound-tube extending through said casing, an iron-clad receiver mounted in the said casing with its diaphragm opposite a passage in communication with said sound-tube, and means for controlling the circuits of said transmitter and receiver.

14. Telephonic apparatus comprising a casing ing having a speaking-aperture in its periphery and containing a transmitter, a receiver and a switch device adapted to control the circuit of said transmitter and receiver, a sound-tube about which said casing is mounted to turn, a U-shaped holder carrying said sound-tube, and a support upon which said holder is mounted to turn about a vertical axis.

15. Telephonic apparatus comprising a casing having a speaking-aperture in its periphery, a sound-tube about which said casing is mounted to turn, a spring arranged between said casing and sound-tube so as to be stressed when the casing is turned to bring the aperture therein into position for use, a holder for said sound-tube, a support upon which said holder can turn about a vertical axis, hearing-tubes in communication with the ends of said sound-tube and one of which is fixed to the end of said casing, a waterproof transmitter arranged within said casing and having its diaphragm opposite the speaking-apertures therein, a receiver carried by said sound-tube and having its diaphragm opposite a passage leading to said sound-tube, and a switch device located within said casing, arranged to be operated by the movement thereof, and adapted to thereby control the circuits of said transmitter and receiver.

16. In telephonic apparatus, a horizontal sound-tube, means for carrying the same so that it can rotate about a vertical axis, a casing mounted to turn about said tube, a water-tight transmitter located within said casing opposite an aperture therein, a receiver carried by said sound-tube, and a switch for controlling the circuits of said transmitter and receiver, said switch comprising a number of insulated connections, a holder secured to said sound-tube and to which said connections are fixed, and insulated circular contacts fixed to the inner surface of one side of said casing and against which some of the stationary connections are arranged to bear by rotation of said casing.

17. Telephonic apparatus comprising a hollow pillar, a U-shaped hollow holder mounted to turn thereon about a vertical axis, a horizontal sound-tube fixed to said holder, a casing mounted to rotate about the axis of said sound-tube and having a speaking-aperture in its periphery, a waterproof transmitter carried by said casing and having its diaphragm opposite said speaking-aperture, a receiver carried by said sound-tube and having its diaphragm opposite a passage leading to said sound-tube, a bell external to said casing, two hearing-tubes arranged in communication with the opposite ends of said sound-tube and one of which is fixed to said casing, a switch device having its stationary connections carried by said sound-tube and its movable connections carried by said casing, the aperture in said casing and the switch-contacts being so arranged that when the hearing-tube fixed to the casing hangs downward, the aperture will be at the bottom of the casing, the circuit of the bell will be closed, and the circuits of the transmitter and receiver will be opened and when the casing is rotated by the said hearing-tube to bring the speaking-aperture into position for use, the bell will be out of circuit and the transmitter and receiver in circuit.

18. Telephonic apparatus comprising a casing having a speaking-aperture at its periphery, a sound-tube about the axis of which said casing can rotate, a hollow holder carrying said sound-tube and mounted to rotate about a vertical axis, a transmitter, receiver and switch device located within said casing, and a circuit-making device carried by said holder and serving to close the bell-circuit of a telephonic apparatus at a distant station, said casing and holder being adapted to admit of the passage therethrough of the electrical connections for said switch, and the holder for the passage therethrough of the electrical connections of said circuit-making device.

19. Telephonic apparatus comprising a casing having a speaking-aperture in its periphery and containing a transmitter and a receiver, a sound-tube about which said casing is mounted to turn, a holder carrying said sound-tube, a support upon which said holder is mounted to turn about a vertical axis, a set of insulated rotary contacts carried by said holder and to which the telephonic connections are made, and a set of fixed contacts carried by said support, arranged to bear against the respective rotary contacts and to which corresponding electrical connections are made.

20. Telephonic apparatus comprising a casing having a speaking-aperture in its periphery and containing a transmitter and a receiver, a sound-tube about which said casing is mounted to turn, a holder carrying said sound-tube, a support upon which said holder is mounted to turn about a vertical axis, a switch device located in said casing and adapted to control the circuits of said transmitter and receiver, insulated rotary contacts carried by said holder and connected to the switch connections, and insulated fixed contacts carried by said support, bearing against the respective rotary contacts, and to which conductors forming continuations of the switch connections are attached.

21. In telephonic apparatus the combination with a movable casing containing a transmitter and a receiver, and having a speaking-aperture in its periphery, a sound-tube about the axis of which said casing can rotate, a holder carrying said sound-tube and mounted to rotate about a vertical axis, a bell and electric generator external to said casing, a switch for controlling said transmitter, receiver and bell, and the electrical connections for said switch, of two or more pairs of line-wires extending to telephonic apparatus at two or more distant stations, and a supplementary switch device adapted to admit of said transmitter and receiver being connected at will to any one of the pairs of line-wires.

22. In telephonic apparatus, the combination with a casing mounted to turn about a horizontal axis and also about a vertical axis, a transmitter and a receiver located within said casing, a main switch device adapted to control the circuits of said transmitter and receiver, electrical connections substantially as described connected to said switch and comprising a main conductor for the transmitter, a main conductor for the receiver, and a return-conductor, a bell having one terminal connected to said return-conductor, and an electric generator having one pole connected to one of said main conductors and the other pole to said return-conductor, of a number of pairs of line-wires, and a supplementary switch device comprising a set of insulated contacts each of which is connected to one of the line-wires of a pair of line-wires, a second set of insulated contacts each of which is connected to the remaining line-wire of a pair of line-wires, a third set of insulated contacts upon which the several contacts of the second set normally bear, separate electric indicators each having one end of its winding connected to one of the contacts in the third set of contacts and its other end in connection with the second terminal of the bell, and a rotary body adapted by rotation to move one or other of the contacts of the second set of contacts from the corresponding contact of the third set of contacts and place it in connection with one of the main conductors and to place the corresponding contact in the first set of contacts in connection with the other main conductor.

23. In telephonic apparatus, the combination with a transmitter and a receiver, a bell, an electric generator, a switch for controlling said transmitter, receiver and bell, and the electrical connections for said switch and generator comprising two main conductors one for the transmitter and the other for the receiver, of a number of pairs of line-wires extending to telephonic apparatus at distant stations, and a supplementary switch device comprising a set of fixed contacts to which the main conductor of the transmitter is connected, a second set of fixed contacts to which the main conductor of the receiver is connected, a number of pairs of insulated spring-contacts connected to the pairs of line-wires, a third set of fixed contacts against each of which one of the spring-contacts of each pair of contacts normally bears, a set of electrical indicators each having its winding connected at one end to one of the contacts of the third set and its other end to the bell, and a movable device whereby one of the contacts of either pair of spring-contacts can be moved from the corresponding contact in the third set of contacts and caused to bear against the corresponding contact in the second set of contacts and also to cause the second spring-contact of the pair to bear against the corresponding fixed contact in the first set of contacts.

Signed at London, England, this 23d day of December, 1903.

ALFRED GRAHAM.

Witnesses:
H. D. JAMESON,
A. NUTTING.